United States Patent
Jones et al.

(10) Patent No.: US 6,823,409 B2
(45) Date of Patent: Nov. 23, 2004

(54) COHERENCY CONTROL MODULE FOR MAINTAINING CACHE COHERENCY IN A MULTI-PROCESSOR-BUS SYSTEM

(75) Inventors: Phillip M. Jones, Spring, TX (US); Paul B. Rawlins, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 414 days.

(21) Appl. No.: 09/965,894

(22) Filed: Sep. 28, 2001

(65) Prior Publication Data

US 2003/0070016 A1 Apr. 10, 2003

(51) Int. Cl.[7] .............................................. G06F 13/00
(52) U.S. Cl. ..................... 710/107; 710/52; 710/305; 710/306; 711/146
(58) Field of Search ..................... 710/52, 107, 305, 710/306; 711/141, 143, 146, 163, 167, 168

(56) References Cited

U.S. PATENT DOCUMENTS

| | | | |
|---|---|---|---|
| 5,313,626 A | 5/1994 | Jones et al. ................. 395/575 |
| 5,331,646 A | 7/1994 | Krueger et al. ............. 371/40.1 |
| 5,367,669 A | 11/1994 | Holland et al. .............. 395/575 |
| 5,819,105 A | * 10/1998 | Moriarty et al. ............... 710/5 |
| 5,822,611 A | * 10/1998 | Donley et al. ................. 710/6 |
| 5,893,151 A | * 4/1999 | Merchant ..................... 711/140 |
| 5,966,729 A | * 10/1999 | Phelps ........................ 711/146 |
| 5,991,819 A | * 11/1999 | Young ......................... 709/253 |
| 6,098,132 A | 8/2000 | Olarig et al. ............... 710/103 |
| 6,209,067 B1 | * 3/2001 | Collins et al. .............. 711/158 |
| 6,223,301 B1 | 4/2001 | Santeler et al. ................ 714/6 |
| 6,226,695 B1 | * 5/2001 | Kaiser et al. ................... 710/5 |
| 6,279,084 B1 | * 8/2001 | VanDoren et al. .......... 711/141 |
| 6,279,087 B1 | * 8/2001 | Melo et al. ................. 711/146 |
| 6,345,341 B1 | * 2/2002 | Arimilli et al. ............. 711/141 |
| 6,487,621 B1 | * 11/2002 | MacLaren ................... 710/240 |
| 2003/0065843 A1 | * 4/2003 | Jones et al. ................. 710/107 |
| 2003/0200397 A1 | * 10/2003 | McAllister et al. ......... 711/141 |

* cited by examiner

Primary Examiner—Xuan M. Thai (57) ABSTRACT

A mechanism for efficiently filtering snoop requests in a multi-processor bus system. Specifically, a snoop filter is provided to filter unnecessary snoops in a multi-bus system.

17 Claims, 3 Drawing Sheets

COHERENCY CONTROL MODULE FOR MAINTAINING CACHE COHERENCY IN A MULTI-PROCESSOR-BUS SYSTEM

BACKGROUND OF THE INVENTION

1. Field of the Invention

This invention relates generally to a multi-processor-bus memory system and, more particularly, to an efficient mechanism for filtering processor cache snoops in a multi-processor-bus-system.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The use of computers has increased dramatically over the past few decades. In years past, computers were relatively few in number and primarily used as scientific tools. However, with the advent of standardized architectures and operating systems, computers soon became virtually indispensable tools for a wide variety of business applications. Perhaps even more significantly, in the past ten to fifteen years with the advent of relatively simple user interfaces and ever increasing processing capabilities, computers have now found their way into many homes.

The types of computer systems have similarly evolved over time. For example, early scientific computers were typically stand alone systems designed to carry out relatively specific tasks and required relatively knowledgeable users. As computer systems evolved into the business arena, mainframe computers emerged. In mainframe systems, users utilized "dumb" terminals to provide input to and to receive output from the mainframe computer while all processing was done centrally by the mainframe computer. As users desired more autonomy in their choice of computing services, personal computers evolved to provide processing capability on each users desktop. More recently, personal computers have given rise to relatively powerful computers called servers. Servers are typically multi-processor computers that couple numerous personal computers together in a network. In addition, these powerful servers are also finding applications in various other capacities, such as in the communications and Internet industries.

Computers today, such as the personal computers and servers discussed above, rely on microprocessors, associated chip sets, and memory chips to perform most of their processing functions. Because these devices are integrated circuits formed on semi-conducting substrates, the technological improvements of these devices have essentially kept pace with one another over the years. In contrast to the dramatic improvements of the processing portions of the computer system, the mass storage portion of the computer system has experienced only modest growth in speed and reliability. As a result, computer systems failed to capitalize fully on the increased speed of the improving processing systems due to the dramatically inferior capabilities of the mass data storage devices coupled to the systems.

There are a variety of different memory devices available for use in microprocessor-based systems. The type of memory device chosen for a specific function within a microprocessor-based system generally depends upon which features of the memory are best suited to perform the particular function. There is often a tradeoff between speed and cost of memory devices. Memory manufacturers provide an array of innovative, fast memory chips for various applications. Dynamic Random Access Memory (DRAM) devices are generally used for main memory in computer systems because they are relatively inexpensive. When higher data rates are necessary, Static Random Access Memory (SRAM) devices may be incorporated at a higher cost. To strike a balance between speed and cost, computer systems are often configured with cache memory. Cache memory is a special high-speed storage mechanism which may be provided as a reserved section of the main memory or as an independent high-speed storage device. A memory cache is a portion of the memory which is made of the high speed SRAM rather than the slower and cheaper DRAM which is used for the remainder of the main memory. Memory caching is effective since most computer systems implement the same programs and request access to the same data or instructions repeatedly. By storing frequently accessed data and instructions in the SRAM, the system can minimize its access to the slower DRAM.

Some memory caches are built into the architecture of the microprocessor themselves, such as the Intel 80486 microprocessor and the Pentium processor. These internal caches are often called level 1 (L1) caches. However, many computer systems also include external cache memory or level 2 (L2) caches. These external caches sit between the central processing unit (CPU) and the DRAM. Thus, the L2 cache is a separate ship residing externally with respect to the microprocessor. However, despite the apparent discontinuity in nonmanclature, more and more microprocessors are incorporating larger caches into their architecture and referring to these internal caches as L2 caches. Regardless of the term used to describe the memory cache, the memory cache is simply an area of memory which is made of Static RAM to facilitate rapid access to often used information.

As previously discussed, frequently accessed data may be stored in the cache memory area of main memory. Thus, the portion of the system which is accessing the main memory should be able to identify what area of main memory it must access to retrieve the required information. A "tag RAM" identifies which data from the main memory is currently stored in each cache line. The data is stored in the cache. The values stored in the tag RAM determine whether the actual data can be retrieved quickly from the cache or if the requesting device will have to access the slower DRAM portion of the main memory. The size of the data store determines how much data the cache can hold at any one time. The size of the tag RAM determines what range of main memory can be cached. Many computer systems, for example, are configured with a 256 k L2 cache and tag RAM that is 8 bits wide. This is sufficient for caching up to 64 MB of main memory.

In a multi-processor system, each processor may have a corresponding main memory, with each main memory reserving a portion for cache memory. The process of managing the caches in a multi-processor system is complex. "Cache coherence" refers to a protocol for managing the caches of a multi-processor system so that no data is lost or over-written before the data is transferred from a cache to a requesting or target memory. Each processor may have its own memory cache that is separate from a larger shared RAM that the individual processors will access. When these multi-processors with separate caches share a common memory, it is necessary to keep the caches in a state of coherence by insuring that any shared operand that has changed in any cache is changed throughout the entire system. Cache coherency is generally maintained through either a directory based or a snooping system. In a directory based system, the data being shared is placed in a common directory that maintains the coherence between the caches. The directory acts as a filter through which the processor must ask permission to load an entry from the primary memory to its cache. When an entry is changed, the directory either updates or invalidates the other caches with that entry. Disadvantageously, directory based coherency systems add to the cycle time (previously reduced by the implementation of cache memory) by requiring that each access to the cache memory go through the common directory. In typical snooping systems, all caches on a bus monitor (or snoop) the bus to determine if they have a copy of the block of data that is requested on the bus. Every cache has a copy of the sharing status of every block of physical memory it has.

Thus, cache coherence aims at solving problems associated with sharing data in a multi-processor computer system which maintains separate caches. This problem is further promulgated when the computer system includes multiple processor buses. In a multi-processor-bus shared memory system, a host controller must maintain memory coherency throughout all the processor caches. This requires snoop cycles to be run on buses other than the originating bus. A snoop filter may be implemented to minimize the amount of snoop cycles on other buses. To maintain efficiency, the snoop filter should facilitate data look up from the tag RAMs as quickly as possible to determine the proper snoop response on the processor bus in a minimal number of clock cycles.

The present invention may be directed to one or more of the problems set forth above.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
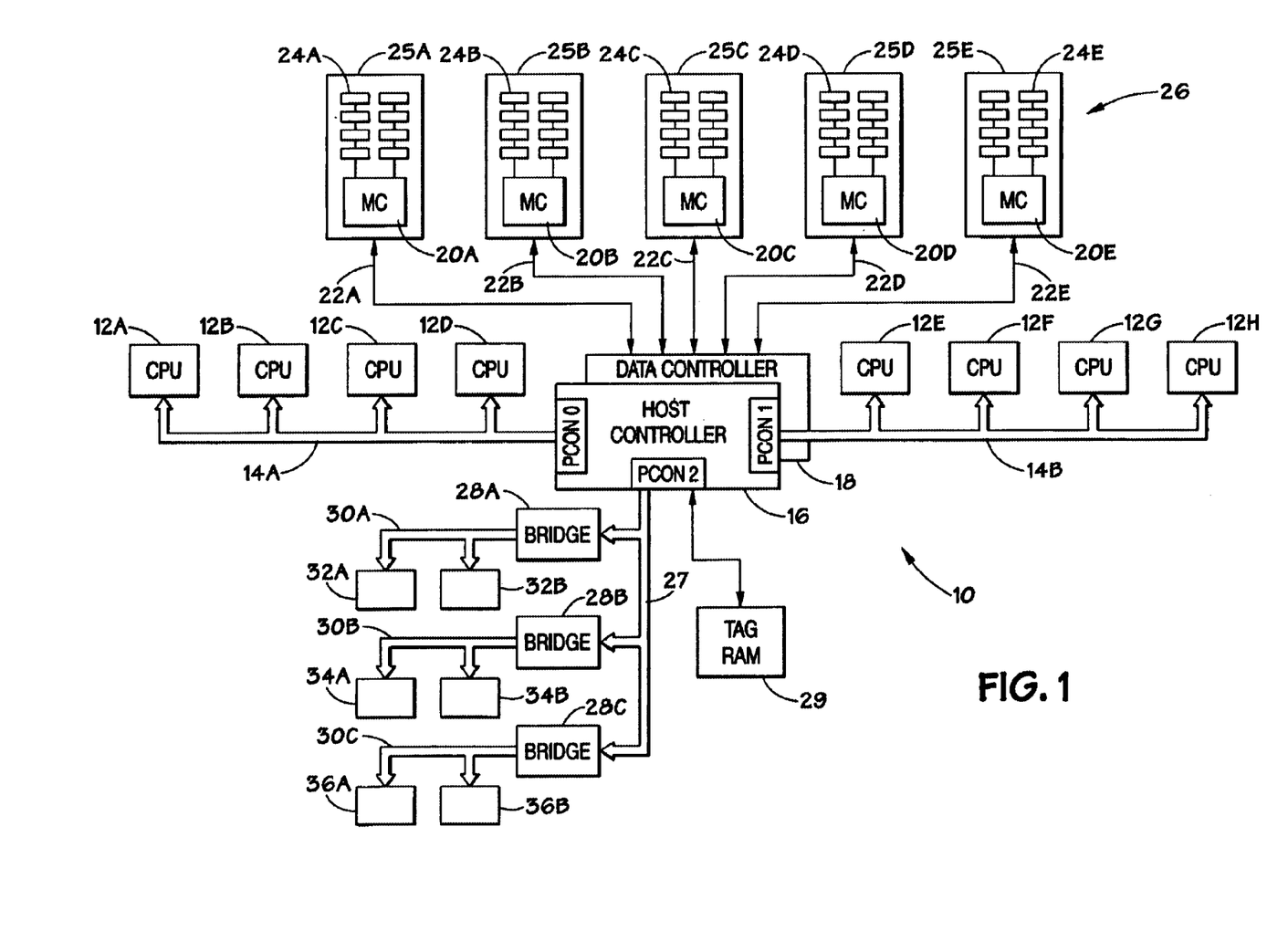
FIG. 1 illustrates a block diagram of an exemplary multi-processor-bus computer system.

Turning now to the drawings and referring initially to FIG. 1, a block diagram of an exemplary multi-processor-bus computer system is illustrated and designated generally as reference numeral 10. The computer system 10 typically includes one or more processors or CPUs. In the exemplary embodiment, the system 10 utilizes eight microprocessors 12A–12H. The system 10 utilizes a split bus configuration in which the processors 12A–12D are coupled to a first bus 14A, whereas the processors 12E–12H are coupled to a second bus 14B. It should be understood that the processor or processors 12A–12H may be of any suitable type, such as a microprocessor available from Intel, AMD, or Motorola, for example. Furthermore, any suitable bus arrangement may be coupled to the processors 12A–12H, such as a split bus (as illustrated), or individual buses. By way of example, the exemplary system 10 may utilize Intel Pentium III processors and the buses 14A and 14B may operate at 100/133 MHz.

Each of the buses 14A and 14B is coupled to a chip set which includes a host controller 16 and a data controller 18. In this embodiment, the data controller 18 is effectively a data cross bar slave device controlled by the host controller 16. Therefore, these chips will be referred to together as the host/data controller 16,18. The host/data controller 16,18 is further coupled to one or more memory controllers. In this particular example, the host/data controller 16,18 is coupled to five memory controllers 20A–20E via five individual bus segments 22A–22E, respectively. Each of the memory controllers 20A–20E is further coupled to a segment of main memory designated as 24A–24E, respectively. As discussed in detail below, each of the memory segments or modules 24A–24E is typically comprised of dual inline memory modules (DIMMs). Further, each memory module 24A–24E and respective memory controller 20A–20E may comprise a single memory cartridge 25A–25E which may be removable. In the present configuration, data may be stored in a "4+1" parity striping pattern wherein one of the memory cartridges 25A–25E is used to provide redundancy. Collectively, the memory cartridges 25A–25E (containing the memory modules 24A–24E) make up the RAM memory 26 of the system 10. Further, the system 10 includes an area of cache memory, functionally illustrated as tag RAM 29.

The host/data controller 16,18 is typically coupled to one or more bridges 28A–28C via an input/output (I/O) bus 27. The opposite side of each bridge 28A–28C is coupled to a respective bus 30A–30C, and a plurality of peripheral devices 32A and 32B, 34A and 34B, and 36A and 36B may be coupled to the respective buses 30A, 30B, and 30C. The bridges 28A–28C may be any of a variety of suitable types, such as PCI, PCI-X, EISA, AGP, etc.

As previously discussed, each CPU 12A–12H may include a segment of cache memory for storage of frequently accessed data and code. Coherency between the caches found in each CPU 12A–12H is further complicated by the split bus configuration since coherency must be maintained between the separate buses. Also, because requests may originate from or be directed to not only one of the CPUs 12A–12H but also from one of the peripheral devices 32A–B, 34A–B, or 36A–B, cache coherency must be maintained along the I/O bus 27, as well. To maintain coherency, a mechanism is provided in the host/data controller 16, 18 to efficiently facilitate snooping of the buses in the present multi-processor/multi-bus system 10.

The host controller 16 typically includes a processor controller (PCON) for each of the processor and I/O bus 14A, 14B, and 27. For simplicity, the processor controller corresponding to the processor bus 14A is designated as "PCON0." The processor controller corresponding to the processor bus 14B is designated as "PCON1." The processor controller corresponding to the I/O bus 27 is designated as "PCON2." Essentially, each processor controller PCON0–PCON2 serves the same function which is to connect the buses which are external to the host controller 16 (i.e., processor bus 14A and 14B and I/O bus 27) to the internal blocks of the host controller 16. Thus, PCON0–PCON2 provide the interfaces between the buses 14A, 14B, and 27 and the host controller 16.

Figure 2:
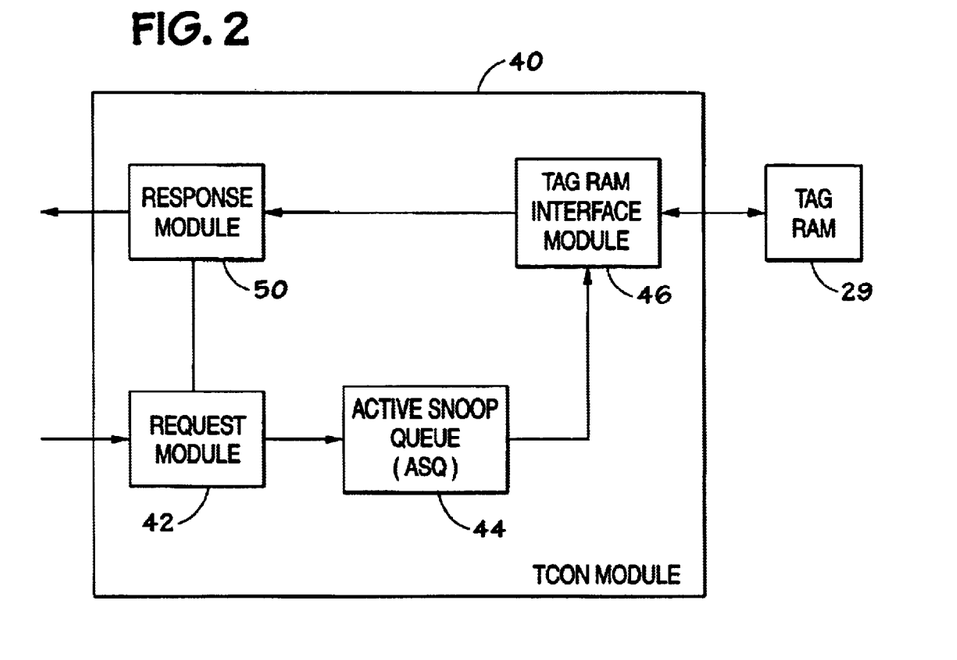
FIG. 2 illustrates a block diagram of a snoop filter in accordance with the present technique.

FIG. 2 illustrates a block diagram of a tag control (TCON) module 40 which may be used in accordance with the present techniques to manage the snooping process efficiently. That is to say, the TCON module 40 serves as a snoop filter to minimize the number of clock cycles required to obtain cache state information and to determine the proper snoop response on the processor or I/O buses 14A, 14B, and 27. In the present embodiment, the TCON module 40 resides within the host controller 16. Alternatively, the TCON module 40 may reside in some external device which has access to each of the processor buses 14a and 14B and the I/O bus 27.

There are four main functional blocks within the TCON module 40. The first block is the request module 42. The request module 42 accepts the cycle requests from the processor controllers PCON0, PCON1, and PCON2 (FIG. 1) and schedules the cycles to be run through the tag look up. Generally, the request module 42 maintains proper request order, prioritizes the input, and establishes each of the queues or list structures. The request module 42 insures memory coherency through proper cycle order, arbitrates access to the memory among the processor and I/O buses 14a, 14B, and 27, and optimally utilizes the tag look up bandwidth.

As previously stated, the request module 42 is responsible for maintaining proper cycle order. This is accomplished using content addressable memory (CAM) of new cycles against existing cycles. Generally, the CAM requests provide a means of insuring that memory WRITEs are only performed when necessary. Because many READ and WRITE requests are active at any given time on the memory and I/O buses 14A, 14B, and 27, a CAM request is issued to insure that the READ and WRITE requests are performed only when necessary and according to proper dependencies. When one of the processor controllers PCON0–PCON2 issues a new cycle request, the cycle checks for cycle order dependencies across the existing cycles in the request buffer. READs are compared against all WRITEs across all buses 14A, 14B and 27 to preserve data coherency. Further, READs are compared against all READs on the same bus to preserve data coherency through proper data order. Only one memory READ can be deferred at a time. If a cycle is deferrable, subsequent cycles are retried. Otherwise, the subsequent cycles are held in a parent/child list which defines the priority of the dependent requests (or children) based on the priority of the primary request (or parent). If, for instance, a WRITE request is issued to a particular location in memory, and subsequently, a READ request is issued to that same location in memory, the request module 42 will insure that the WRITE request is executed before the READ request. When the READ request is submitted, it is compared to all outstanding WRITE requests. Because READ requests are typically prioritized ahead of WRITE requests, without a CAM cycle, the READ could be processed before the WRITE request and thus return old or invalid data from the memory location. The request module 42 will be further discussed with reference to FIG. 3.

The TCON module 40 also includes an active snoop queue (ASQ) 44 which may include one or more buffers which contain the indices of all requests which are currently active in the TCON module 40. The indices are used to prevent multiple accesses to the same index simultaneously. In general, the ASQ 44 includes buffers to maintain a list of current cycles that are being processed through the tag RAM interface module 46. The ASQ 44 only permits one access per cache line index at a time to maintain proper cycle order and cache state information. In the present embodiment, there is one ASQ 44 for each tag RAM interface module 46. A single ASQ 44 and tag RAM interface module 46 are illustrated in FIG. 2. However, as further explained with reference to FIG. 3, it may be advantageous to incorporate more than one ASQ 44 and tag RAM interface module 46. In the present embodiment, each ASQ 44 permits sixteen cycles to be active at a time, with each of these cycles being processed independently. Because the ASQ 44 buffers include a fixed number of locations, the number of tag lines that are currently active is limited by the size of the buffers in the ASQ 44. The ASQ 44 will be further discussed with reference to FIG. 3.

The tag RAM interface module 46 provides the interface with the tag RAM 29. The tag RAM 29 is a separate memory storage device from main memory 26 that keeps track of all cachelines in use by the CPUs 12A–12H. Thus, the tag RAM 29 provides a look-up table for the cache state in cache memory. The tag RAM interface module 46 is optimized to make efficient use of the bandwidth in the SRAM (i.e., cache memory). To minimize the turn around clocks required when switching between READ and WRITE requests, the WRITE requests are queued so that they may burst directly to the SRAM in back-to-back clock cycles. The tag RAM interface module 46 also reduces the number of READs to the SRAM whenever possible by interpreting the cache data based on the cycle characteristics. This may occur if a cycle has a non-cacheable attribute or if the cycle is an explicit writeback. If the cycle has a non-cacheable attribute, there is no reason to check the tag RAM since the requested information will not be stored in the cache memory. Conversely, if the request is an explicit writeback (which is a cycle initiated by a CPU 12A–12H to update the memory 26 with modified data), the requested data is known to be in the cache memory, without checking the tag RAM 29. When one of these cycles occur, the tag RAM interface module 46 may switch from a READ mode to a WRITE mode. The tag RAM interface module 46 also minimizes the amount of WRITEs to the SRAM whenever the processor performs a WRITE to an unallocated address. This preserves the address that was allocated prior to the WRITE and alleviates the need to perform an unnecessary castout which is a forced expulsion of old data from the cache. Finally, the tag RAM interface module 46 has programmable state transition values that can be tuned to optimize performance based on testing. The programmability includes selecting shared versus owned on a code READ and shared versus owned on a data READ. As can be appreciated by those skilled in the art, basic cache protocol dictates that data be one of the four types: modified, exclusive, shared, or invalid (MESI). "Owned" data refers to data that is either modified or exclusive. The functionality of the tag RAM interface module 46 will be better understood in light of FIG. 3 and the corresponding description.

The response module 50 receives the current tag state information for a cycle being processed by the ASQ 44.

Based on the tag state value, castout snoops, shared snoops, or invalidate snoops may be run on one or more of the processor buses 14A and 14B to maintain cache coherency. A castout snoop is run when the tag index of the current cycle does not match the value in the tag RAM 29. A shared snoop is run when a cacheline must be removed from modified or exclusive to shared. An invalidate snoop is run when a cacheline must be removed from modified, exclusive, or shared to invalid. After all required snoops have been completed, the response module 50 updates the tag RAM 29 with the new state information and releases the slot occupied in the ASQ 44.

Figure 3:
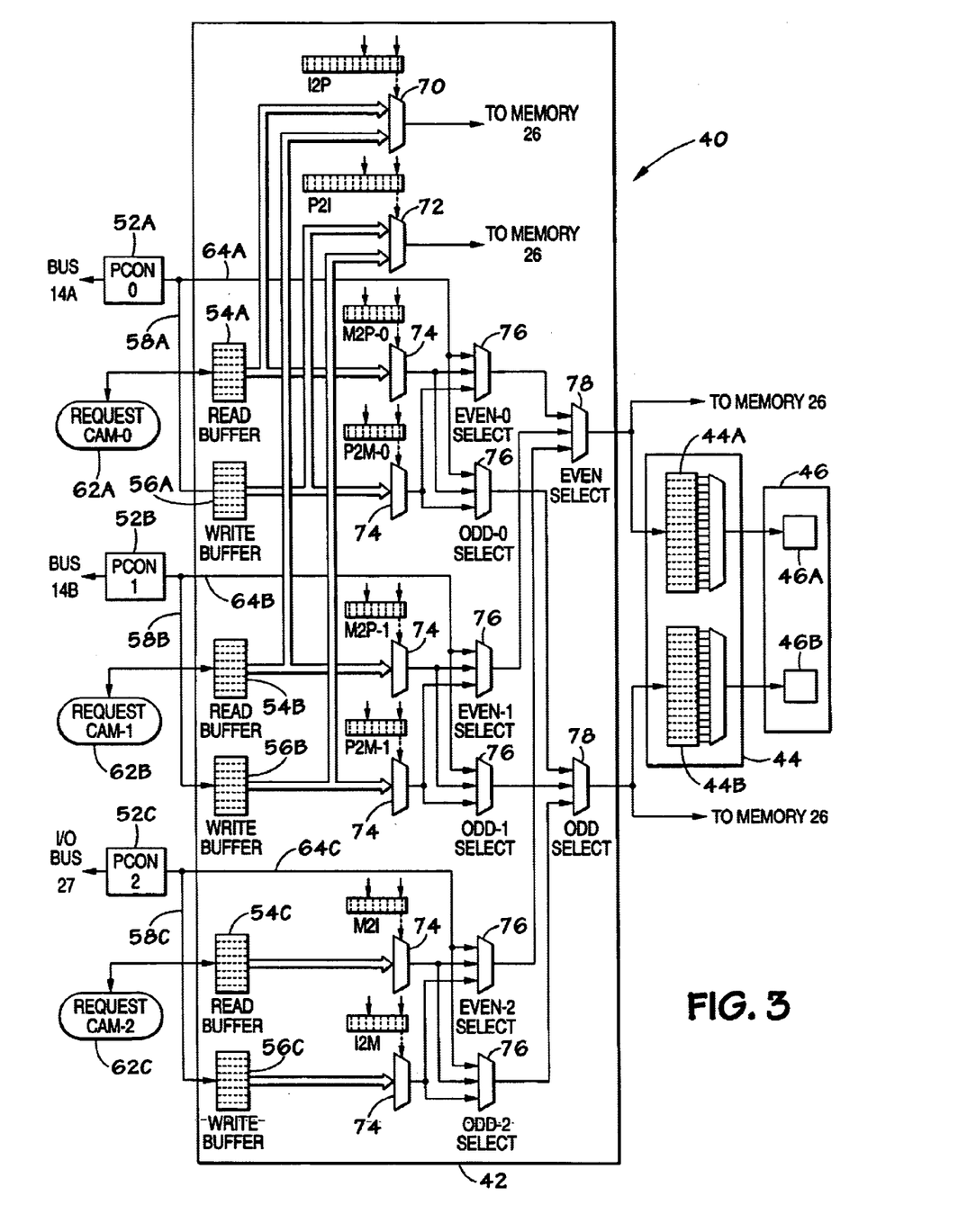
FIG. 3 illustrates a more detailed block diagram of an exemplary embodiment of the snoop filter of FIG. 2.

Turning now to FIG. 3, a more detailed description of the TCON module 40 and the data path through the TCON module 40 is illustrated. As previously discussed, the TCON module 40 receives input from the processor controllers PCON0–PCON2. Specifically, the processor controllers PCON0, PCON1, and PCON2, designated as 52A–52C, each monitor a corresponding bus and sends cycle requests to the appropriate destination (e.g., I/O or memory). Requests from each processor controller 52A–52C are then stored in respective READ and WRITE buffers 54A–54C and 56A–56C until the requests are dispersed to their proper destination. In this embodiment, each READ buffer 54A–54C and each WRITE buffer 56A–56C can store up to sixteen READ and WRITE cycles respectively. A request is delivered from the processor controller 52A–52C to the READ buffer 54A–54C or WRITE buffer 56A–56C along a request path 58A–58C. The request signals which are delivered along the request path 58A–58C may be buffered for fanout purposes. In the present embodiment, the entries into the READ and WRITE buffers 54A–54C and 56A–56C may be indexed using bits 3–0 in the request. Bit 4 may be set to distinguish between READ requests and WRITE requests and therefore provides the routing information to send the request to the proper buffer 54A–54C or 56A–56C.

As previously discussed, for each request which is stored in a respective READ buffer 54A–54C, the READ request is advantageously compared against WRITE requests across all processor controllers 52A–52C and against all READ requests on the same processor controller 52A–52C to preserve data coherency through a CAM request. The request module 42 controls the CAM requests 62A–62C for each of the respective READ buffers 54A–54C. Depending on the response from the CAM request 62A–62C, the request module 42 may reprioritize the present READ request.

A primary concern in maintaining cache coherency is to find the state of the cache line in the system as efficiently as possible. Memory READs are generally higher priority than memory WRITEs since providing READ requests as quickly as possible is advantageous. WRITE requests can generally be fulfilled with less time criticality. There may be exceptions when, for instance, the WRITE buffers 56A–56C become full or reach a threshold or when READ requests are dependent on a WRITE request. To provide the requested information as quickly as possible, a bypass path 64A–64C is provided for each processor controller 52A–52C. Often, the READ request can be sent immediately to the tag RAM interface module 46 if there are no other requests waiting to be run in the system. Each time a READ request is delivered, it is sent quickly through the bypass path 64A–64C, thus bypassing storage and compare logic which may be unnecessary. On a first clock cycle, the READ request is sent along the bypass path 64A–64C. On the next clock cycle, the CAM request 62A–62C is performed. If there are no other requests at that particular address, no additional management steps are used to maintain coherency. If the CAM request 62A–62C detects a WRITE request to the same address, the response module sends an abort through the system to cancel the READ request which was sent along the bypass path 64A–64C. The abort command is sent on the next clock cycle. Essentially, the speed of the processing of the READ requests is made more efficient by forcing the READ request quickly through the system and subsequently checking to see if the READ request is going to be valid. If not, then the READ request sent ahead on the bypass path 64A–64C is aborted, and the READ request is then prioritized using the list structures and arbitration mechanisms discussed below. The request signals delivered along the bypass path 64A–64C may be buffered for fanout purposes.

The TCON module 40 incorporates a plurality of list structures to maintain the order of the requests in the READ and WRITE buffers 54A–54C and 56A–56C. The WRITE list structures 56A–56C are generally first-in-first-out (FIFO) such that requests are processed in the order in which they were received, thereby fulfilling the ordering requirements for the WRITE requests. This simple processing scheme is generally adequate for the WRITE requests since they are generally less time critical than the READ requests. The READ requests are generally more complicated based on the prioritization and arbitration scheme discussed herein. Generally, the list structures are designed as two dimensional doubly-linked lists. These lists insure that proper cycle order is maintained for each type of transaction. The design of the lists allow for both the insertion and deletion of a cycle request in a single clock cycle. In addition, the READ request list for each processor controller 52A–52C is designed to immediately rotate a request cycle from the head to the tail of the list whenever the required resources are unavailable, thus allowing other READ requests to gain access to the resources. The list structures are described in more detail below and discussed further with reference to FIG. 4.

As previously explained, each processor controller 52A–52C connects an external bus, such as the processor bus 14A or 14B or the I/O bus 27, to the internal blocks of the host controller 16. To identify the individual list structures, the nomenclature described in table 1 may be helpful. Table 1 describes requests between the input/output ("I"), the processor ("P"), and the memory ("M"). Thus, transactions involving one of the CPUs 12A–12H will include a P in the name of the list structure, and so forth. Thus, the list structure 12P refers to READ requests from one of the processors 12A–12H to one of the devices on the I/O bus 27. The P2I list structure refers to a WRITE request from one of the processors 12A–12H to one of the devices on the I/O bus 27. M2P-0 refers to the list structure containing READ requests from the memory 26 to one of the processors 12A–12D on the processor bus 14A. P2M-0 refers to the list structure wherein one of the processors 12A–12D on the processor bus 14A wants to WRITE to memory 26. For transactions involving the processors 12E–12H on processor bus 14B, the list structures are designated M2P-1 and P2M-1 referring to the corresponding READ and WRITE requests between the processors 12E–12H on processor bus 14B and the memory 26. The M2I list structure refers to the READ requests from the devices on the I/O bus 27 to the memory 26. The I2M list structure refers to WRITE requests from devices on the I/O bus 27 to the memory 26. The nomenclature is summarized in Table 1, below.

TABLE 1

List Structure Nomenclature

| List Name | Request Type | Description |
|---|---|---|
| I2P | READ | I/O (PCON2) wants to read from CPU |
| P2I | WRITE | I/O (PCON2) wants to write to CPU |
| M2P-0 | READ | CPU (PCON0) wants to read from memory |
| P2M-0 | WRITE | CPU (PCON0) wants to write to memory |
| M2P-1 | READ | CPU (PCON1) wants to read from memory |
| P2M-1 | WRITE | CPU (PCON1) wants to write to memory |
| M2I | READ | I/O device (PCON2) wants to read from memory |
| I2M | WRITE | I/O device (PCON2) wants to write to memory |

The list structures may contain any number of desirable locations. In the present embodiment, the P2M and M2P list structures contain sixteen locations per PCON0 and PCON1. The I2M and the M2I list structures each contain sixteen locations for PCON2. The P2I and I2P list structures each contain 32 locations, sixteen for PCON0 and sixteen for PCON1.

Dependency pointers are used to guarantee proper ordering of cycles to preserve the memory coherency and proper request processing order. The dependencies are established at the time a new request is delivered to a READ or WRITE buffer 54A–54C or 56A–56C. The dependency status is cleared whenever a cycle is removed from the READ or WRITE buffers 54A–54C and 56A–56C. A CAM request 62A–62C is performed using the ID of the retired cycle against all dependencies. When a new memory READ request is received (i.e., M2P or M2I), a CAM lookup of the address is performed against the WRITE request buffer of all three PCONs 52A–52C. If a "CAMHIT" results, a dependency of the READ to follow the last WRITE for each PCON 52A–52C with a CAMHIT is established. Further, when a new I2P request is received, a dependency of the READ to follow the last cycle, if any, in the P2I list is structure established. Finally, when a new P2I request is received, a dependency of the WRITE to follow the last cycle, if any, in the I2P list structure is established. When a cycle is retired out of order due to a CAMHIT, all dependencies on that cycle are modified to point to the previous cycle in the corresponding list. If there is no previous cycle, the dependency status is cleared.

The "head" and "tail" pointer structures associated with each list structure indicate the first and last locations in the list structure which are filled. When a request is added to the list structure, it is submitted to the tail of the list structure. Once a request reaches the head of the list structure, the request will be processed unless it has a dependency in which case the request will be moved to the tail of the list structure.

There are two types of list structures utilized to maintain order of the cycles stored in the READ request buffers 54A–54C: Active List and Parent Child List. The WRITE request buffers 56A–56C utilize only the Active List. The Active List contains pointers to cycles that are available for arbitration to the ASQ 44. The structure is a double linked list with a head and tail pointer as previously discussed and further discussed with reference to FIG. 4, below. Each cycle in the request buffers 54A–54C and 56A–56C corresponds to a location in a next-pointer array and the previous-pointer array. READ and WRITE cycles are never combined into the same list structure so the pointers do not need to maintain the READ/WRITE bit from the cycle request id (bit 4 in the example described above). The Parent Child List contains pointers to memory READ cycles that are to the same address as another memory READ cycle active in the request buffer within the same PCON 52A–52C. The structure is a double-linked list without a head or tail pointer as will be discussed further with reference to FIG. 4 below. If a request cycle does not have a parent, it appears on the Active List. Conversely, if an active cycle does have a parent, it appear on the Parent Child List. A request cycle is assigned to the Parent Child List if a READ request is dependent on another READ request occurring first. It will be doubly-linked below the parent on which it depends. Once the parent request is processed, the child request is moved to the tail end of the Active List.

To reduce the latency in an idle system, requests to the tag RAM interface 46 proceed immediately when a request is received. One clock cycle later, the status of the ASQ CAMHIT is valid, indicating whether the requested address was found. If true, the abort status of the cycle will be set. This results in a slot assigned to the request in the active snoop buffer being marked available. Further, upon completion of the tag lookup from SRAM, if the cycle was not aborted, the tag RAM interface module 46 will transfer the results to the TCON response module 50.

The cycle request arbitration portion of the Request module 42 is designed to optimize the utilization of the two tag RAM interface 46 and includes a plurality of multiplexors. The present embodiment illustrates a system wherein the even and odd addresses of each request have been separated to be processed by individual portions of the TCON module 40. Thus, the TCON module 40 illustrated in FIG. 3 illustrates even and odd arbitration logic (multiplexors, discussed below), even and odd ASQs (active snoop buffer) 44A and 44B and even and odd tag RAM interface modules 46A and 46B. In an alternate embodiment, a different arbitration configuration and a single ASQ 44 and tag RAM interface module 46 may be implemented. Further, in another embodiment, it may be advantageous to implement more than two ASQs 44A and 44B and more than two tag RAM interfaces 46A and 46B. The arbiters efficiently assign requests for the READ queue and WRITE queue of each of the three processor controllers 52A–52C (PCON0, PCON1, and PCON2) to the tag RAM interfaces 46A and 46B. READ requests from one of the three processor controllers 52A–52C bypass the front end list structures and are sent immediately to one of the tag RAM interfaces 46A and 46B via the bypass path 64A–64C prior to performing any qualifying checks on the READ. On the next clock, the qualifying checks are performed. If a conflict is detected, the READ request to the tag RAM interface 46A or 46B is aborted.

READ requests that could not bypass the front and list structures are normally arbitrated to the tag RAM interface 44A or 44B at higher priority than WRITEs since WRITEs are posted and do not affect system performance. As previously discussed, WRITEs are dynamically arbitrated at higher priority than READs under two conditions: 1) there is a READ cycle that has a dependency upon a WRITE cycle; and 2) the number of queued WRITEs has surpassed some programmable threshold. The second condition may be set by the BIOS or firmware to minimize the system delays as a result of a backlog in the WRITE queue. In certain systems, it may be advantageous, for instance, to flush a WRITE queue once there are twelve requests sitting in the WRITE buffer. In this case the WRITE buffer will be flushed and the WRITE requests will be processed while the READ requests, which are normally prioritized higher than the WRITE requests, are stalled until either the WRITE buffer is emptied or the requests in the WRITE buffer are reduced to some minimum threshold value, such as four.

Cycle disbursement may be facilitated as follows. For the P2I and the I2P cycle requests (i.e., the WRITE and READ requests between PCON2 from the I/O bus and the CPUs 12A–H) are dispersed to the I/O queue in the order that the cycles are received. This is illustrated in FIG. 3 by arbiters 70 and 72 which may be multiplexors, for example. The arbitration scheme for requests to main memory 26 is more complicated. For memory access arbitrations, there are two levels of arbitration for both the even and odd active buffers: "intra-PCON" and "inter-PCON." Generally, a first multiplexor 74 is provided for each of the remaining list structures, as with the I2P and P2I structures 70 an 72. The multiplexor 74 cycles the requests through from the corresponding READ or WRITE buffer 54A–54C or 56A–56C in the order in which they are received. Next, the requests are divided based on their even or odd address. Thus, even and odd arbitration occurs independently. The next arbitration mechanism, here a multiplexor 76, arbitrates between all requests from one particular processor controller (PCON0, PCON1, or PCON2) 52A–52C. The arbitration performed by the multiplexor 76 for each processor controller is referred to as intra-PCON arbitration. The intra-PCON arbitration has a four level priority arbitration: high, medium, low, and none. High priority may be assigned to those WRITE requests which have a READ dependency thereon. Medium priority may be assigned to all other READ requests and to WRITE requests when a threshold value is exceeded in the list structures, as previously discussed. Low priority may be assigned to all other WRITE requests without extenuating circumstances. No priority is assigned if the request queue is empty, for example.

Once the intra-PCON arbitration is settled for a particular PCON, the multiplexor 76 will output the highest priority request on that particular PCON to an inter-PCON arbitration mechanism, here a multiplexor 78. The inter-PCON arbitration executes a round robin arbitration between the three requesting agents (PCON0, PCON1, and PCON2). Each multiplexor 78 checks each request from PCON0, PCON1, and PCON2 for a high priority request. If one of the inputs includes a high priority request, it will be processed first. Then the next input is checked. For example, the multiplexor 78 may first check the input from PCON0. If the request has a high priority, it will be processed through the multiplexor first. If it does not, the multiplexor 78 will check the request from PCON1. If the request on PCON1 was of high priority, it will be processed through the multiplexor 78. If this request is not high priority the multiplexor 78 will check PCON2 to check if there is a high priority on the input of the multiplexor 78. Again, if there is a high priority, the request will be processed through the multiplexor 78. The process is then repeated starting again at PCON0, going through the medium requests of each of the PCON channels, and then repeating again for the low priority requests. As each request is processed through the multiplexor 78, it is sent to a respective ASQ 44A or 44B. The ASQ cycle tracker maintains a list of current cycles that are being processed through the tag RAM interface 46A or 46B as previously discussed.

Figure 4:
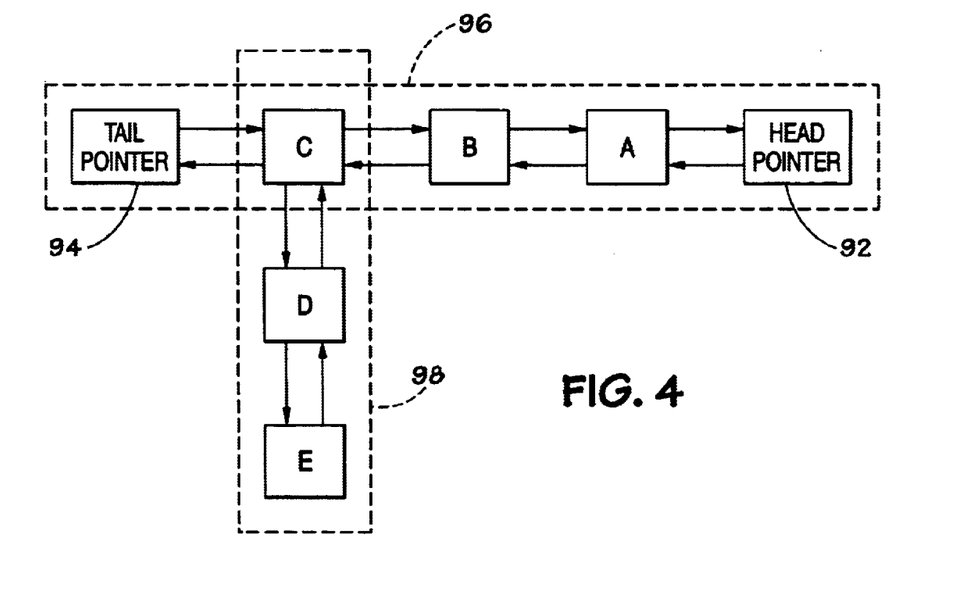
FIG. 4 illustrates a block diagram of an exemplary two dimensional doubly linked list structure.

FIG. 4 illustrates an exemplary two dimensional, doubly-linked list structure 90 (e.g. M2P-0, P2M-0, M2I, etc.), as previously described with reference to FIG. 3. The list structure 90 includes the proper ordering for the processing of each of the requests in the respective read and write buffers 54A–54C and 56A–56C. Each list structure 90 includes a head pointer 92 and a tail pointer 94 to insure that proper cycle order is maintained. The head and tail pointers 92 and 94 associated with each list structure 90 indicate the first and last locations in the list structure 90 which are filled with requests (READ or WRITE, depending on the particular list structure 90). Thus, when a request is linked (or pointing to) the head pointer 92, as with request A in FIG. 4, that request is the next request to be processed. When a request is added to the list structure 90, it is submitted to the tail of the list structure. Once a request reaches the head of the list structure, the request will be processed unless it has a dependency in which case the request will be moved to the tail of the list structure, as will be described below.

The list structure 90 includes an Active List 96 and a Parent Child List 98. The Active List 96 contains pointers to cycles that are available for arbitration to the ASQ 44. The Active List 96 of the list structure 90 is a double linked list with a head and tail pointer 92 and 94. Each cycle in the request buffer corresponds to a location in a next-pointer array and the previous-pointer array. For instance, Request A is linked to the Head Pointer 92, as well as Request B. On a first transition, Request A will be processed and the link from Request B to Request A will be replaced with a link from Request B to the head pointer 92. On the next transition, Request B will be processed since it is now linked to the head pointer 92. The design of the list structure 90 allows for both the insertion and deletion of a cycle request in a single clock cycle. Thus, if for instance, Request B is cancelled, it will be removed from the list structure 90, and on the same transition, request C will be linked to Request A. In addition, for a list structure associated with a READ request the list is designed to immediately rotate a request cycle from the head to the tail of the list whenever the required resources are unavailable, thus allowing other READ requests to gain access to the resources.

The Parent Child List 98 of the list structure 90 manages the dependencies associated with particular requests with need to be performed in a particular order. A request cycle is assigned to the Parent Child List 98, if the request is to the same address as another request occurring first and it will be doubly linked below its parent on which it depends. Dependency pointers are used to guarantee proper ordering of cycles to preserve the memory coherency and proper program order. The dependencies are established through the CAM requests 62A–62C at the time a new request is delivered to a READ or WRITE buffer 54A–54C or 56A–56C, as previously discussed. The dependency status is cleared whenever a cycle is removed from the READ or WRITE buffers 54A–54C and 56A–56C. The Parent Child List 98 contains pointers to memory READ cycles that are to the same address as another memory READ cycle active in the request buffer within the same processor controller (PCON0-2) 52A–52C. The structure is a double linked list without a head or tail pointer. In the exemplary list structure illustrated in FIG. 4, Request D is dependent on Request C, and Request E is dependent on Request D. Each request is doubly linked and thus points to the proceeding and subsequent requests. As with the Active List 96, when a request is retired out of order due to a CAMHIT, for example, all dependencies on that cycle are modified to point to the previous cycle in the corresponding list. Thus, if Request D is cancelled, Request E will be linked to Request C. If there is no previous cycle, the dependency status is cleared.

If a Request does not have a parent, as with Requests A, B, and C, it appears on the Active List 96. Conversely, if a Request does have a parent, as with Requests D and E, it appears on the Parent Child List 98. Once the parent request is processed, the child request will be moved to the tail end of the Active List 96. Thus, in the present example, once Request C is processed, Request D will be moved to the end of the Active List 96.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A computer system comprising:

a host controller;

a first processor bus coupled between the host controller and a first processor;

a second processor bus coupled between the host controller and a second processor;

a random access memory (RAM) coupled to the host controller via a memory bus, the RAM comprising a portion of static memory and a portion of dynamic memory; and a coherency control module operably coupled to the first processor bus and the second processor bus and comprising:

a request module configured to receive requests from the first processor bus and the second processor bus and to maintain proper ordering of the requests from each processor bus;

an active snoop queue (ASQ) module coupled to the request module and configured to maintain a list of requests currently being processed and to prevent simultaneous multiple accesses to a single address in the static portion of the RAM; and a static RAM interface module configured to access an address look-up table corresponding to data stored in the static portion of the RAM.

2. The computer system, as set forth in claim 1, comprising an input/output (I/O) bus coupled between the host controller and a plurality of I/O devices, wherein the I/O bus is operably coupled to the coherency control module and wherein the request module is configured to receive requests from the I/O bus.

3. The computer system, as set forth in claim 1, wherein the coherency control module is located within the host controller.

4. The computer system, as set forth in claim 1, wherein the coherency control module comprises a plurality of list structures corresponding to the first processor bus and the second processor bus.

5. The computer system, as set forth in claim 4, wherein the list structures comprise two-dimensional doubly-linked lists with head and tail pointers.

6. The computer system, as set forth in claim 5, wherein the list structures comprise dependency links.

7. The computer system, as set forth in claim 4, wherein the request module comprises a plurality of bypass paths configured to provide a direct request path from the first and second processor buses to the static RAM interface module, thereby bypassing the list structures.

8. The computer system, as set forth in claim 1, wherein the active snoop queue module comprises a plurality of active snoop queues, each active snoop queue configured to maintain a list of requests currently being processed and to function independently with respect to each other.

9. The computer system, as set for the in claim 1, wherein the static RAM interface module comprises a plurality of static RAM interfaces, each static RAM interface corresponding to a segment of the static portion of the RAM.

10. A coherency control module configured to control access to cache memory in a computer system, the coherency control module comprising:

a request module configured to receive requests from a plurality of buses in a computer system and to maintain proper ordering of the requests from each bus;

an active snoop queue (ASQ) module coupled to the request module and configured to maintain a list of requests from all of the buses currently being processed and to prevent multiple accesses to a single address in the cache memory simultaneously; and a static RAM interface module configured to access an address look-up table corresponding to data stored in the cache memory.

11. The coherency control module, as set forth in claim 10, wherein the plurality of buses comprise processor buses.

12. The coherency control module, as set forth in claim 10, wherein the coherency control module comprises a plurality of list structures corresponding to the first processor bus and the second processor bus.

13. The coherency control module, as set forth in claim 12, wherein the list structures comprise two-dimensional doubly-linked lists with head and tail pointers.

14. The coherency control module, as set forth in claim 13, wherein the list structures further comprise dependency links.

15. The coherency control module, as set forth in claim 12, wherein the request module comprises a plurality of bypass paths configured to provide a direct request path from the first and second processor buses to the static RAM interface module, thereby bypassing the list structures.

16. The coherency control module, as set forth in claim 10, wherein the active snoop queue module comprises a plurality of active snoop queues, each active snoop queue configured to maintain a list of requests currently being processed and to function independently with respect to each other.

17. The coherency control module, as set forth in claim 10, wherein the static RAM interface module comprises a plurality of static RAM interfaces, each static RAM interface corresponding to a segment of the static portion of the RAM.

* * * * *